E. B. FRANZHEIM.
WHEEL.
APPLICATION FILED DEC. 22, 1911.
1,031,921.
Patented July 9, 1912.
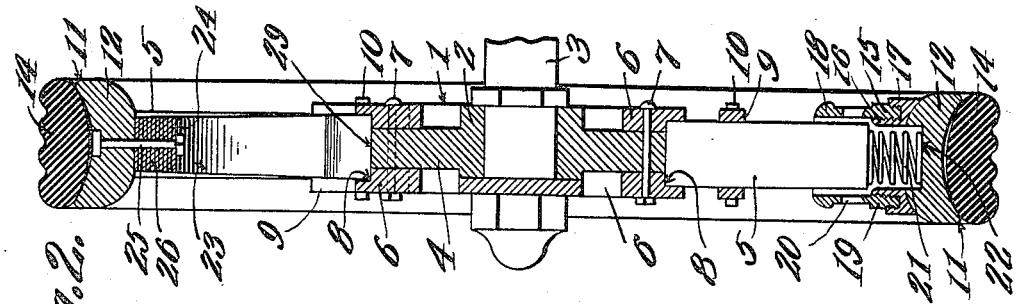
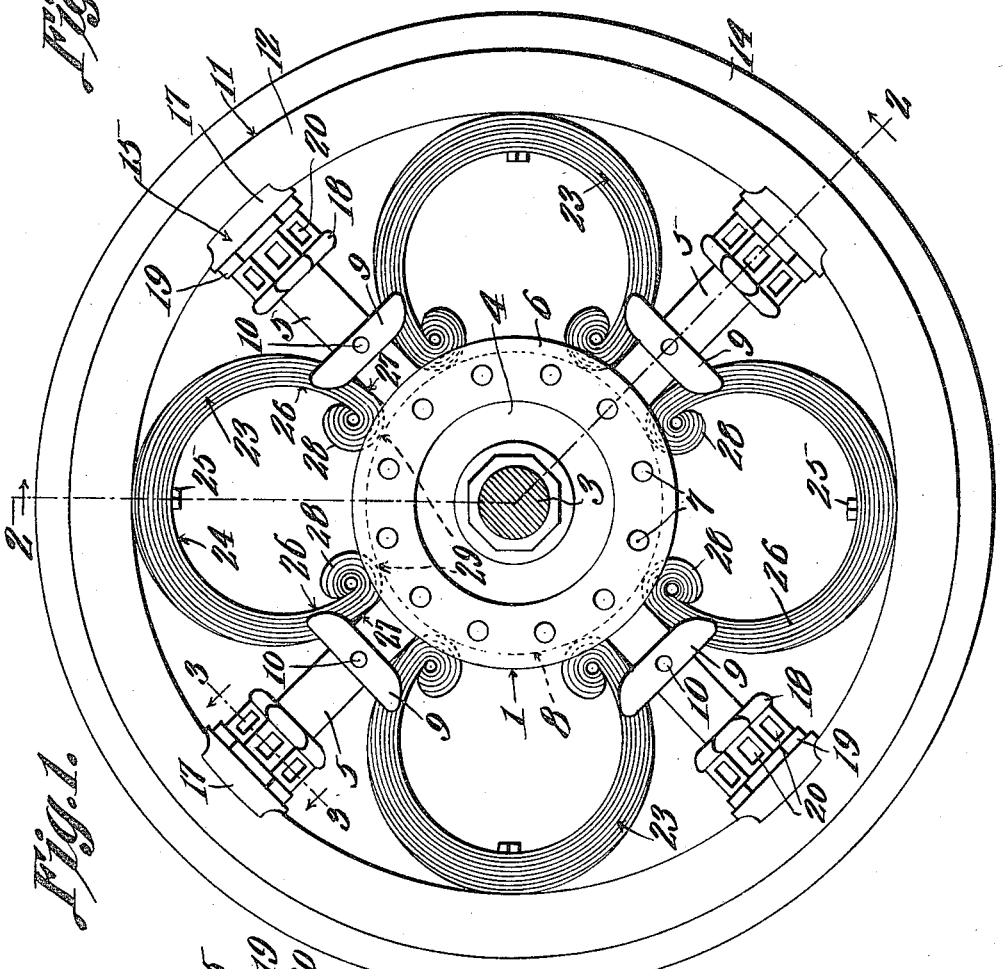
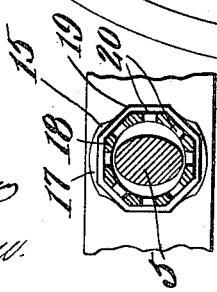
Edward B. Franzheim,
Inventor
Witnesses
by
Attorneys

UNITED STATES PATENT OFFICE.

EDWARD BATES FRANZHEIM, OF WHEELING, WEST VIRGINIA.

WHEEL.

1,031,921. Specification of Letters Patent. Patented July 9, 1912.

Application filed December 22, 1911. Serial No. 667,390.

*To all whom it may concern:*

Be it known that I, EDWARD B. FRANZHEIM, a citizen of the United States, residing at Wheeling, in the county of Ohio and State of West Virginia, have invented a new and useful Wheel, of which the following is a specification.

The primary object of the present invention is to provide a wheel in which the hub and the rim are spring-spaced, thereby giving the desired resiliency to the wheel, without the employment of pneumatic tires.

A further object of the invention is to provide spring elements of novel and improved form, and to provide novel means for holding the springs assembled with the hub and with the rim.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows in side elevation, a wheel constructed in accordance with the present invention; Fig. 2 is a section upon the line 2—2 of Fig. 1; and Fig. 3 is a transverse section through one of the sockets which are mounted upon the rim, for the reception of the spokes.

*The hub.*—The hub is denoted generally by the numeral 1 and is a composite structure, the same including a socket 2, receiving the axle 3. A spoke plate 4 outstands from the hub 1, and from the spoke plate 4 radiates the spokes 5. Retaining rings 6 are applied to opposite sides of the spoke plate 4, the rings 6 projecting beyond the periphery of the spoke plate. The retaining rings 6 are held upon the spoke plate 4 by means of securing elements 7, extended through the rings and through the spoke plate, the construction being such that one or both of the rings may be removed at will. As seen in Fig. 2, the spokes 5 are somewhat wider than the spoke plate 4, the retaining rings being rabbeted, as shown at 8, to receive the inner end portions of the spokes 5. Clips 9 are applied to opposite sides of the spokes 5, the clips projecting terminally beyond the spokes. The clips 9 are removably held upon the spokes 5 by means of securing elements 10 of any desired form.

*The rim.*—The rim 11 is a composite structure, and comprises a felly 12, circumscribed by a tire 14 of any desired form, the tire preferably being of solid construction. Secured to the felly 12 are inwardly projecting sockets 15, of which there may be any number. The sockets 15 comprise an inner flange 16 and an outer flange 17, both being of tubular form, the flanges 16 and 17 being threaded to receive the ends of thimbles 18, provided with wrench faces 19, whereby the thimbles may be rotated. The thimbles 18, beyond the sockets 15, are pierced by a series of openings 20. The extremities of the spokes 5 are received slidably within the thimbles 18, the bore of each thimble preferably being circular while, as clearly shown in Fig. 3, the spokes 5 are preferably, although not necessarily, of oval transverse section.

*The supporting springs.*—Helical compression springs 21 are mounted within the sockets 15, the outer ends of the springs 21 being received in depressions 22, formed in the inner face of the felly 12, within the contour of the sockets 15. The inner ends of the springs 21 bear against the outer ends of the spokes 5. Other, arched springs 23 are provided, the intermediate portions 24 of which bear against the felly 12, between the sockets 15. The intermediate portions 24 of the springs 23 are held against the felly 12 by means of securing elements 25, passing through the springs 23 and entering the felly 12. The springs 23, as clearly shown, preferably consist of a plurality of leaves. As shown at 26, the free ends of the springs 23 are received between the clips 9, the clips 9 constituting means for preventing the ends of the springs 23 from moving laterally. As shown at 27, the ends of the springs 23 abut against the spokes 5, the ends of the springs being curved, to form rounded heads 28, bearing against the periphery of the spoke plate 4, as clearly shown in Fig. 2, and as indicated by the reference character 29.

*Operation.*—As will be understood, the springs 21 serve to support the spokes 5, and consequently the hub 1, yieldably. Since the heads 28 of the springs 23 engage with the periphery of the spoke plate 4, the springs 23 also serve as a yieldable means for supporting the hub 1. Since the ends of the springs 23 are received between the clips 9, and between the retaining rings 6, lateral movement of the ends of the springs will be prevented and since the springs 23 bear, as shown at 27, against adjacent spokes 5, circumferential movement of the rim 11 with respect to the hub 1 cannot take place. The thimbles 18 may be slid upon the spokes 5, toward the axis of the wheel, whereupon the hub and the spokes may be placed in alinement with the rim 11. The thimbles 18 may then be slid outwardly, and be rotated, so as to engage with the sockets 15, the springs 23 being connected with the felly 12, by means of the securing elements 25. The assembling and knocking down of the wheel herein disclosed is, therefore, a matter which may be accomplished readily, and by the use of a wrench.

Having thus described the invention, what is claimed is:—

1. A wheel comprising a hub; a rim; spokes radiating from the hub and loosely engaged with the rim; retaining members secured to the hub and projecting beyond the periphery of the hub; spaced clips secured transversely to each spoke; and arched springs secured in their intermediate portions to the rim, the ends of the arched springs resting upon periphery of the hub for movement circumferentially of the hub, and being engaged, against lateral movement, between the clips and between the retaining members; the ends of the clips of adjacent spokes being spaced apart to provide for an insertion of the springs into the clips.

2. A wheel comprising a hub; a rim; retaining members applied to opposite sides of the hub; spokes radiating from the hub; springs interposed between the ends of the spokes and the rim; clips applied to opposite faces of the spokes; arched springs secured in their intermediate portions to the rim, the clips of the arched springs being received between the ends, the extremities of the springs terminating in rounded heads, bearing upon the hub, and engaged beneath against lateral movement, between the retaining members.

In testimony that I claim the foregoing as my own, I have hereto affixed my signature in the presence of two witnesses.

EDWARD BATES FRANZHEIM.

Witnesses:
CHAS. E. DILLON,
JOHN J. MURRAY.

Copies of this patent may be obtained for five cents each, by addressing the "Commissioner of Patents. Washington, D. C."